United States Patent
Barenyi

[11] 3,823,968
[45] July 16, 1974

[54] ARRANGEMENT OF BUMPER IN MOTOR VEHICLES

[75] Inventor: Bela Barenyi, Maichingen, Germany

[73] Assignee: Daimler-Benz AG, Stuttgart, Germany

[22] Filed: Feb. 17, 1972

[21] Appl. No.: 227,133

[30] Foreign Application Priority Data
Feb. 8, 1971 Germany.................... 2107702

[52] U.S. Cl. ................................ 293/84
[51] Int. Cl. ............................. B60r 19/06
[58] Field of Search .................... 293/84, 74

[56] References Cited
UNITED STATES PATENTS

| | | |
|---|---|---|
| 1,381,614 | 6/1921 | Baumgartl .................... 293/84 |
| 1,435,100 | 11/1922 | Bilterman et al. ............. 293/84 |
| 1,448,504 | 3/1923 | Plante ......................... 293/84 |
| 1,497,653 | 6/1924 | Coote .......................... 293/84 |
| 1,687,287 | 10/1928 | Gossman ...................... 293/84 |
| 1,777,342 | 10/1930 | Williams ...................... 293/84 |
| 1,792,157 | 2/1931 | Franke ......................... 293/84 |
| 1,807,640 | 6/1931 | Thomas ........................ 293/84 |

Primary Examiner—M. Henson Wood, Jr.
Assistant Examiner—Robert Saifer
Attorney, Agent, or Firm—Craig & Antonelli

[57] ABSTRACT

An arrangement of a bumper in vehicles, especially in motor vehicles, according to which the bumper is yieldingly supported at the support structure of the vehicle, such as the frame or chassis-frame, whereby the bumper is guided in the horizontal plane by scissor-like devices having vertical joints which are arranged between the support structure and the bumper.

15 Claims, 5 Drawing Figures

PATENTED JUL 16 1974
3,823,968
SHEET 1 OF 2
FIG. 1
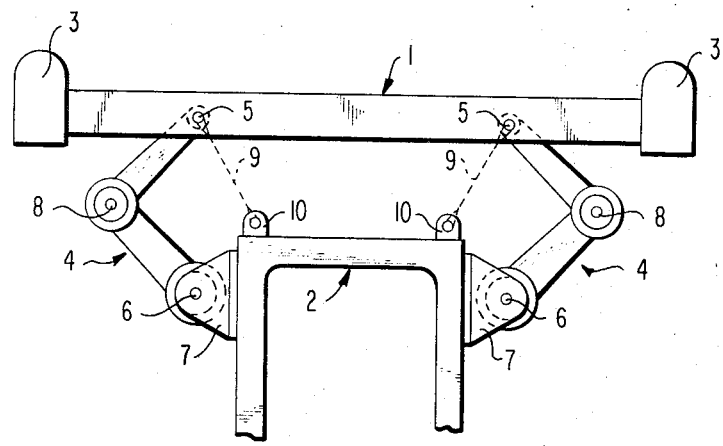
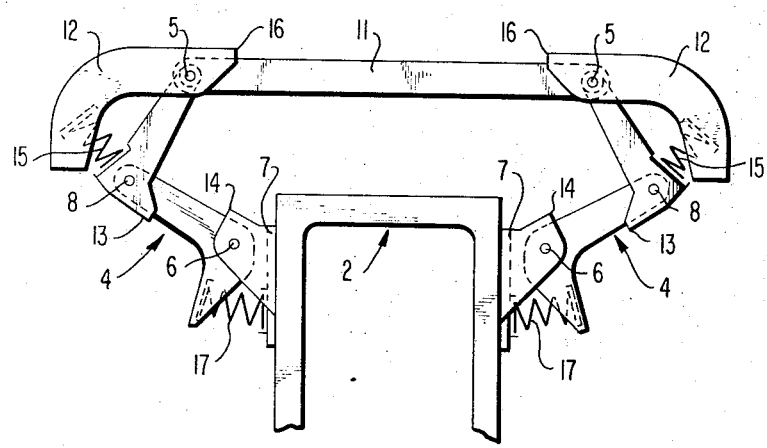
FIG. 2

ARRANGEMENT OF BUMPER IN MOTOR VEHICLES

The present invention relates to the arrangement of a bumper in vehicles, especially in motor vehicles, which is yieldingly supported at the frame-like support structure of the vehicle.

The advantage is achieved with an arrangement of the aforementioned type, as compared with the rigid arrangement to date utilized nearly exclusively, that in case of an impact of the bumper against an obstacle, the bumper and/or the support structure are not immediately damaged. However, the yielding support, which takes place by way of steel or rubber springs or the like, entails difficulties because the bumper must have a relatively large weight in order to exhibit a sufficient form-rigidity. The entire arrangement then tends to an increased extent to vibrations in the vertical and horizontal direction. These vibrations are caused during the normal driving operation by road unevennesses or engine vibrations or the like.

The present invention is therefore concerned with the task to provide an arrangement of the aforementioned type in which the vibrations are excluded or at least far-reachingly prevented. The present invention essentially consists in that the bumper is guided in the horizontal plane by means of jointed scissor-like devices having vertical joints, which are arranged between the support structure and the bumper. Such jointed scissor devices which are nearly rigid in themselves in the vertical direction, preclude vibrations in this direction without, however, impairing the yieldingness in the horizontal plane even in case of inclined impacts.

In order to eliminate also vibrations in the horizontal plane, provision is made in one embodiment according to the present invention that the opening angle of the scissor devices is limited by tensioning cables, tie-rods, abutments or the like. It is possible thereby to prestress the spring elements to a predetermined force.

In a simple embodiment of the present invention, one three-jointed scissor device is arranged on each of the two sides of the support structure, whose center joint is directed outwardly. In another embodiment of the present invention two four-jointed scissor devices are provided symmetrically to the vehicle longitudinal center plane.

It is favorable for the occurring movements if the distance of the main joints secured at the support structure is smaller than the distance of the outer joints mounted at the bumper.

In one advantageous embodiment of the present invention, expanding-springs or torsion-springs of steel or rubber are provided in the center joint for the opening of the scissor members. In another embodiment of the present invention, the outer joint connected at the main joint by way of a spring. In both embodiments of the present invention, one thus obtains the advantage that the springs do not have to be pivotally connected additionally at the bumper.

In a further embodiment of the present invention, provision is made appropriately that the main joint is equipped with torsion-, compression- or volute buffer-springs for the opening of the scissor-like devices and for the centering of the overall arrangement.

In order to be able to construct in a further embodiment of the present invention the bumper itself so as to be relatively inexpensive as to repair, the bumper consists of three parts pivotally connected with each other, whose lateral parts are supported at the jointed scissor devices by way of springs of rubber or steel. It suffices under certain circumstances with this embodiment if only the lateral parts are interchanged or repaired for eliminating a damage.

In a further embodiment of the present invention, shock absorbers are mounted between the bumper and the support structure. The danger of a build-up leading to large vibrations is still further reduced thereby. It is thereby particularly advantageous if the shock absorbers are constructed as automatically returning spring-legs. The additional arrangement of springs can thereby be dispensed with.

It is favorable for the support in the vehicle longitudinal direction if shock absorbers extending in the vehicle longitudinal direction are provided on each side. Therebeyond it is of advantage if for purposes of securing the center position of the bumper, two shock absorbers arranged approximately in the vehicle transverse direction are provided. It is structurally advantageous if the shock absorbers extending in the vehicle longitudinal direction and/or in the vehicle transverse direction are pivotally connected at the bumper in the joint eyes for the outer joints of the scissor devices.

In order to reduce according to a further feature of the present invention the number of shock absorbers, provision is made in an advantageous embodiment of the present invention that the parts adjoining the main joint of the two scissor devices are connected by a transversely disposed shock absorber. The shock absorber is appropriately connected to the two outwardly disposed parts in the case of four-jointed scissor mechanisms.

In order to obtain a favorable force distribution over the entire movement course, it is of advantage if the points of pivotal connection of the shock absorber are disposed closer to the support structure than the main joints. For the same reason it is favorable if the points of pivotal connection have a larger spacing with an extended shock absorber than the main joints.

Accordingly, it is an object of the present invention to provide a bumper arrangement for vehicles, especially for motor vehicles, which avoids by simple means the aforementioned shortcomings and drawbacks encountered in the prior art.

Another object of the present invention resides in a yielding arrangement of a bumper in vehicles which upon impact against an obstacle far-reachingly precludes the immediate damage of the bumper and/or support structure of the vehicle to which the bumper is secured.

A further object of the present invention resides in a bumper arrangement of the yielding type which far-reachingly minimizes the vibration thereof.

Another object of the present invention resides in a bumper for motor vehicles yieldingly connected to the vehicle support structure by way of springs or the like in which the springs are prestressed in the normal position of the bumper.

A further object of the present invention resides in a yielding bumper structure which assures relatively inexpensive repair possibilities in case of damage.

A still further object of the present invention resides in the arrangement of a bumper for motor vehicles in which the number of parts, particularly shock absorbers is minimized while a favorable force distribution is assured over the entire movement travel of the bumper.

These and further objects, features and advantages of the present invention will become more apparent from the following description when taken in connection with the accompanying drawing which shows, for purposes of illustration only, several embodiments in accordance with the present invention, and wherein FIG. 1 is a somewhat schematic plan view of one embodiment of an arrangement of a bumper in accordance with the present invention.

FIG. 2 is a somewhat schematic plan view of a second embodiment of a bumper arrangement in accordance with the present invention.

Figure 3:
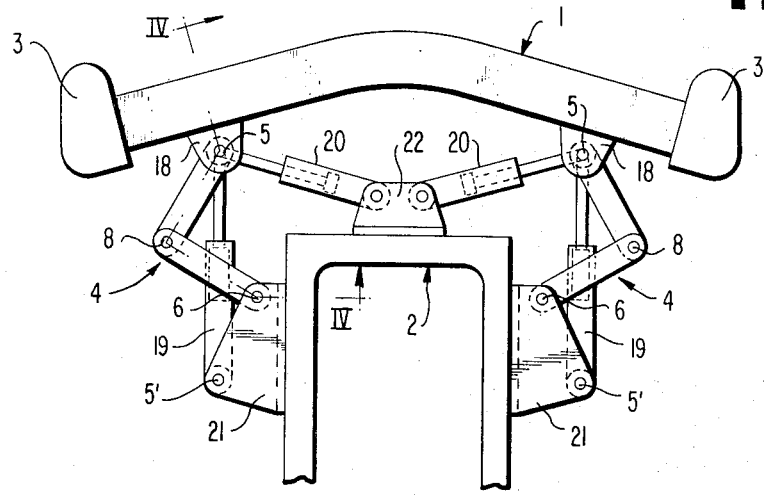
FIG. 3 is a somewhat schematic plan view of a third embodiment of a bumper arrangement in accordance with the present invention.

Referring now to the drawing wherein like reference numerals are used throughout the various views to designate like parts, and more particularly to FIG. 1, in the embodiment according to the present invention illustrated in this figure a bumper generally designated by reference numeral 1 is yieldingly secured at a frame-like support structure generally designated by reference numeral 2 of a vehicle, for example, of a passenger motor vehicle. The support structure may be of any conventional construction, such as a frame, a chassis frame, etc. The bumper 1 consists of a rectilinearly extending center part which is adjoined at the two sides thereof by lateral parts 3 projecting slightly in the outward or forward direction beyond the center part. Two three-joined scissor-like devices generally designated by reference numeral 4 and of conventional construction are arranged between the bumper 1 and the support structure 2, which are pivotally secured with the outer joints 5 thereof at the bumper 1. The main joints 6 are supported in bearing lugs or support brackets 7 which are secured laterally at the support structure 2. The center joints 8 are directed outwardly. Expanding springs of conventional type and not illustrated in detail are provided within the area of the center joints 8; the expanding springs (not shown) which may consist of steel or rubber or also of both of these materials are of conventional construction. Torsion rod springs are mounted in a conventional manner in the main joints 6 which, in addition to the function of expanding the three-jointed scissor-like devices, also serve for the purpose of centering the overall arrangement. The illustrated normal position of the overall arrangement is secured by tensioning cables 9 or the like which limit the opening angle of the three-jointed scissor-like devices 4 and assure the centering of the system. These tensioning cables 9 engage at the outer joints 5 and are secured in eyes 10 of the cross bearer of the support structure 2.

The joint axes of the three-jointed scissor devices 4 extend vertically so that in the vertical direction the bumper 1 is nearly rigidly connected with the support structure 2. Vibrations of the bumper 1 in the horizontal direction are limited by the tensioning cables 9 whereby provision may be additionally made that the tensioning cables 9 prestress the springs arranged in the center joints 8 and in the main joints 6 to a predetermined force.

In the embodiment according to FIG. 2, a bumper is provided consisting of a center profile or sectional member 11 which is pivotally adjoined by two lateral parts 12. The bumper is supported by way of two three-jointed scissor-like devices generally designated by reference numeral 4 at the support structure generally designated by reference numeral 2 of a vehicle. The main joints 6 and the center joints 8 are provided with abutments 13 and 14 which limit the opening angle thereof. By the use of abutments 13 and 14, tensioning cables or tie-rods or the like can be dispensed with. The outer joints 5 are simultaneously the points of pivotal connection for the pivotal connection of the lateral parts 12. The lateral parts 12 are supported at the three-jointed scissor devices 4 by way of compression springs 15. The opening angle thereof is also limited thereby by abutments 16. One compression spring 17 each is provided between the bearing lugs 7 of the main joints 6 and an angularly bent extension of the parts adjoining the same. With this embodiment, the horizontal distance in the vehicle transverse direction between the two outer joints 5 is larger than the distance between the two main joints 6.

Figure 4:
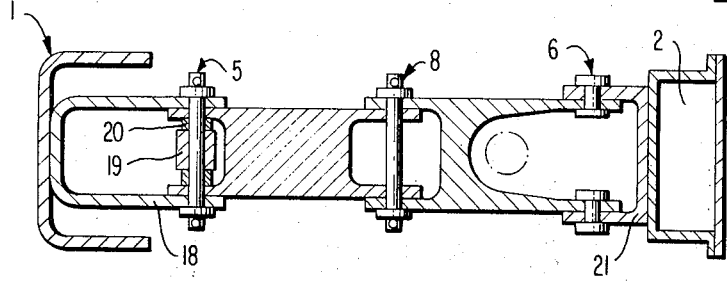
FIG. 4 is a cross sectional view, on an enlarged scale, taken along line IV—IV of FIG. 3.

In the embodiment according to FIG. 3, a bumper generally designated by reference numeral 1 is provided which corresponds essentially to the embodiment according to FIG. 1 but which is constructed in the shape of a forwardly pointing arrow. Two joint lugs or brackets 18 are mounted at the bumper 1 symmetrically to the vehicle longitudinal center plane, in which are supported the outer joints 5 of two three-jointed scissor-like devices 4. Additionally, two shock absorbers 19 extending in the vehicle longitudinal direction and two shock absorbers 20 extending approximately in the transverse direction of the vehicle are mounted between the bumper 1 and the support structure 2. These shock absorbers 19 and 20 are constructed as self-restoring or self-returning spring legs of conventional construction. The shock absorbers 19 are extended into the end position thereof in the initial position illustrated in the drawing. The shock absorbers 19 are arranged in joints 5' between the joint lugs 18 of the bumper 1 and the support lugs 21. The shock absorbers 20, which in the intial position assume a center position, are also secured at the joint lugs 18 of the bumper 1. A support bracket 22 is mounted at the support structure 2 in the center longitudinal plane of the vehicle, at which are secured the other ends of the shock absorbers 20. As illustrated in cross section in FIG. 4, the points of force or stress application of the main joints 6 are disposed further apart than the points of force or stress application of the outer joints 5 and of the center joints 8. It may be appropriate for structural reasons to provide the main joints 6 and the joints 5' of the shock absorbers 19 so as to coincide with one another.

Figure 5:
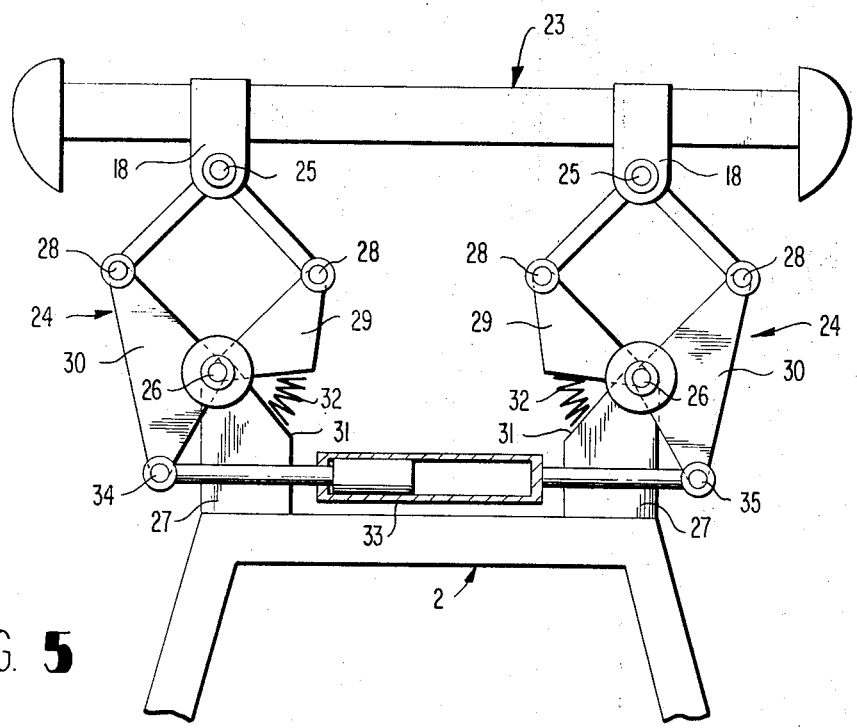
FIG. 5 is a somewhat schematic plan view of still another embodiment of a bumper arrangement in accordance with the present invention.

In the embodiment according to FIG. 5, a bumper generally designated by reference numeral 23 is secured at the support structure generally designated by reference numeral 2 by way of two four-jointed scissor-like devices generally designated by reference numeral 24. The outer joints 25 are supported in joint brackets 18 of the bumper 23. The main joints 26 are provided in support brackets 27 of the support structure 2. The two four-jointed scissor-like devices 24 arranged symmetrically to the vehicle longitudinal center plane each include two center joints 28. The two movable parts 29 and 30 of the four-jointed scissor devices 24 which adjoin the main joints 26, have an approximately triangularly shaped configuration. An expanding spring 32 each is provided between an inclined surface 31 of the support brackets 27 and the inclined outer edges of the parts 29. In the illustrated embodiments, the expanding springs 32 are constructed, for example, as curved coil springs. The two outer parts 30 are connected with each other by a transversely disposed shock absorber 33. The points of pivotal connection 34 and 35 at the two triangularly shaped parts 30 are disposed closer to the support structure 2 than the two main bearings 26. Additionally, their distance in the illustrated normal position with respect to one another is larger than the distance between the two main bearings 26 so that a favorable progressive development of the force or stress absorption is assured over the entire deformation range of the four-jointed scissor-like devices 24. The illustrated normal position is established in this embodiment by the shock absorber 33 which for that purpose is extended in its end position. The shock absorber 33 in this embodiment is also appropriately constructed as self-restoring spring leg.

In all illustrated embodiments, scissor-like devices with legs of equal length are provided. However, leg portions of unequal length may also be utilized for kinematic reasons or vibrational reasons whereby the legs adjoining the main joints are then constructed longer.

While I have shown and described several embodiments in accordance with the present invention, it is understood that the same is not limited thereto but is susceptible of numerous changes and modifications as known to those skilled in the art and I, therefore, do not wish to be limited to the details shown and described herein but intend to cover all such changes and modifications as are encompassed by the scope of the appended claims.

What I claim is:

1. A bumper arrangement for a vehicle of the type having a relatively rigid support structure; said arrangement comprising:

bumper means spaced from said support structure and including impact accepting surfaces thereon, first and second bumper support lever means which are each substantially rigid between respective first and second end portions thereof, first pivotal connection means connecting said first end of said first lever means at said support structure, second pivotal connection means connecting said end of said first lever means to said first end of said second lever means, third pivotal connection means connecting said second end of said second lever means to said bumper means, each of said first, second and third pivotal connection means including means permitting relative pivotal movement of connected parts only about respective vertical pivot axes such that said bumper means is supported by said first and second lever means at said support structure for movement in a horizontal plane during pivotal movements of said first and second lever means, resilient means engageable between at least one of said support structure and bumper means and at least one of said first and second lever means for resiliently biasing said first and second lever means toward predetermined initial bumper supporting positions, said predetermined supporting positions corresponding to maximum spacing of said bumper means from said support structure with maximum pivot angles between said first lever means and said support structure, first limiting means for limiting the maximum pivot angle between said first lever means and said support structure, said first limiting means including means attached to said support structure which are separate from said resilient means, third and fourth bumper support lever means which are each substantially rigid between respective first and second end portions thereof, fourth pivotal connection means connecting said first end of said third lever means at said support structure, fifth pivotal connection means connecting said second end of said third lever means to said first end of said fourth lever means, sixth pivotal connection means connecting said second end of said fourth lever means to said bumper means, each of said fourth, fifth, and sixth pivotal connection means including means permitting relative pivotal movement of connected parts only about respective vertical pivot axes such that said bumper means is supported by said third and fourth lever means at said support structure for movement in a horizontal plane during pivotal movements of said third and fourth lever means, resilient means engageable between at least one of said support structure and bumper means and at least one of said third and fourth lever means for resiliently biasing said third and fourth lever means toward predetermined initial bumper supporting positions, said predetermined supporting positions corresponding to maximum spacing of said bumper means from said support structure with maximum pivot angles between said third lever means and said support structure, and second limiting means for limiting the maximum pivot angle between said third lever means and said support structure, said second limiting means including means attached to said support structure which are separate from said resilient means, wherein said bumper means consists of a center part and a lateral part at each lateral end of said center part, said center and lateral parts being pivotally connected with each other, one of said lateral parts being supported at the first and second lever means by way of spring means, the other of said lateral parts supported at the third and fourth lever means by way of spring means, and wherein said lateral parts are pivotally connected to said center part at respective ones of said third and sixth pivotal connection means.

2. An arrangement according to claim 1, characterized in that said first limiting means includes abutments.

3. An arrangement according to claim 1, characterized in that said spring means which support the lateral parts at the lever means are made from a material selected from the group of rubber and steel.

4. An arrangement according to claim 1, wherein said first limiting means includes abutment means fixed to said support structure.

5. An arrangement according to claim 1, wherein each of said first and second limiting means include abutment means fixed to said support structure.

6. An arrangement according to claim 5, wherein said first and second lever means are arranged at one lateral side of said support structure and said third and fourth lever means are arranged at the other lateral side of said support structure to form a symmetrical arrangement of said lever means with respect to a longitudinally extending centerline of said support structure, and wherein said second and fifth pivotal connection means are spaced laterally outwardly of at least some of the other pivotal connection means.

7. An arrangement according to claim 6, wherein the lateral distance between said first and fourth pivotal connection means is smaller than the lateral distance between said third and sixth pivotal connection means.

8. An arrangement according to claim 6, characterized in that the first and fourth pivotal connection means are provided with spring means for opening the angle between said first and second lever means and between said third and fourth lever means and for centering the overall arrangement.

9. An arrangement according to claim 8, characterized in that said last-mentioned spring means are compression springs.

10. An arrangement according to claim 6, characterized in that the distance between the first and fourth pivotal connection means is smaller than the distance between the third and sixth pivotal connection means mounted at the bumper means.

11. An arrangement according to claim 10, characterized in that the first and fourth pivotal connection means are provided with spring means for opening the angle between said first and second lever means and between said third and fourth lever means and for centering the overall arrangement.

12. An arrangement according to claim 1, wherein further limiting means are provided for limiting the respective maximum angles between said first and second lever means and between said third and fourth lever means, said further limiting means including abutment means on respective ones of said lever means.

13. An arrangement according to claim 12, wherein further limiting means in the form of abutment members at said center part and at said lateral parts are provided to limit pivoting movement of said lateral parts with respect to said center part.

14. An arrangement according to claim 1, characterized in that the first and fourth pivotal connection means are provided with spring means for opening the angle between said first and second lever means and between said third and fourth lever means and for centering the overall arrangement.

15. An arrangement according to claim 1, characterized in that the distance between the first and fourth pivotal connection means is smaller than the distance between the third and sixth pivotal connection means mounted at the bumper means.

* * * * *